US012269260B2

(12) United States Patent
Merencio Naudin et al.

(10) Patent No.: US 12,269,260 B2
(45) Date of Patent: Apr. 8, 2025

(54) PRINTING AND CUTTING

(71) Applicant: Hewlett-Packard Development Company, L.P., Spring, TX (US)

(72) Inventors: Daniel Merencio Naudin, Sant Cugat del Valles (ES); Francisco Javier Roses Conesa, Sant Cugat del Valles (ES); Alberto Arredondo Rosales, Sant Cugat del Valles (ES); Ivan Lopez Avila, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 119 days.

(21) Appl. No.: 17/419,434

(22) PCT Filed: May 16, 2019

(86) PCT No.: PCT/US2019/032709

§ 371 (c)(1),
(2) Date: Jun. 29, 2021

(87) PCT Pub. No.: WO2020/231443

PCT Pub. Date: Nov. 19, 2020

(65) Prior Publication Data

US 2022/0072879 A1 Mar. 10, 2022

(51) Int. Cl.
*B41J 11/70* (2006.01)
*B41J 11/66* (2006.01)

(52) U.S. Cl.
CPC ............ *B41J 11/706* (2013.01); *B41J 11/663* (2013.01)

(58) Field of Classification Search
None
See application file for complete search history.

(56) References Cited

U.S. PATENT DOCUMENTS

| | | | |
|---|---|---|---|
| 4,152,962 A | 5/1979 | Hendrischk | |
| 8,708,590 B2 | 4/2014 | Johnson et al. | |
| 9,227,436 B2 | 1/2016 | De Monet et al. | |
| 9,321,287 B1 * | 4/2016 | Ipponyari | B41J 11/663 |
| 9,789,709 B2 | 10/2017 | Saiga et al. | |
| 10,005,297 B2 | 6/2018 | Navarro et al. | |
| 2007/0013959 A1 * | 1/2007 | Miwa | G06K 15/1848 358/1.12 |

(Continued)

FOREIGN PATENT DOCUMENTS

| | | |
|---|---|---|
| EP | 2470461 A2 | 7/2012 |
| EP | 3134268 A1 | 3/2017 |

(Continued)

*Primary Examiner* — Matthew G Marini
(74) *Attorney, Agent, or Firm* — Jordan IP Law, LLC

(57) ABSTRACT

A method includes obtaining a nominal distance between a printhead and an X cut line position in a printer; obtaining a predetermined slice length of an image to be printed; determining an adjusted slice length as a function of the nominal distance and an offset; advancing a print medium through a print zone of the printer in accordance with the predetermined slice length or the adjusted slice length, and printing an image slice after a print medium advance; repeating the advancing and printing a number N of times; and after the Nth print medium advance, printing an image slice and cutting the print medium at the X cut line position.

13 Claims, 8 Drawing Sheets

(56) References Cited

U.S. PATENT DOCUMENTS

| | | | | |
|---|---|---|---|---|
| 2010/0226704 | A1* | 9/2010 | Kersey | B41J 11/66 400/611 |
| 2011/0048266 | A1* | 3/2011 | Crystal | B65H 35/0086 101/483 |
| 2016/0297212 | A1 | 10/2016 | Saiga et al. | |
| 2017/0120634 | A1* | 5/2017 | Angulo Navarro | B41J 11/663 |

FOREIGN PATENT DOCUMENTS

| | | | |
|---|---|---|---|
| EP | 3299175 | A1 | 3/2018 |
| JP | 2003225889 | A | 8/2003 |
| JP | 2011131492 | A | 7/2011 |
| WO | 2018/236348 | A1 | 12/2018 |

* cited by examiner

PRINTING AND CUTTING

BACKGROUND

When printing on a print medium, e.g. a media roll, after completing printing of an image the printed medium portion including the printed image may be separated from the rest of the print medium. This can be done using a cutter device which is separate from a printer or integrated with or attached to a printer. To obtain a correct cutting line position, the print medium may be positioned for cutting after printing the image, and then repositioned for printing a next image. Cutting may delay the printing process.

BRIEF DESCRIPTION OF THE DRAWINGS

For the purpose of illustration, certain examples will now be described with reference to the accompanying drawings, in which.

DETAILED DESCRIPTION

In the following detailed description, reference is made to the accompanying drawings. The examples in the description and drawings should be considered illustrative and are not to be considered as limiting to the specific example or element described. Multiple examples may be derived from the following description and/or drawings through modification, combination or variation of certain elements. Furthermore, it may be understood that also examples or elements that are not literally disclosed may be derived from the description and drawings by a person skilled in the art. Whereas different examples are described herein, it is understood that features of these examples may be used individually or in combination thereof to derive further variations beyond those explicitly describes herein.

Figure 1:
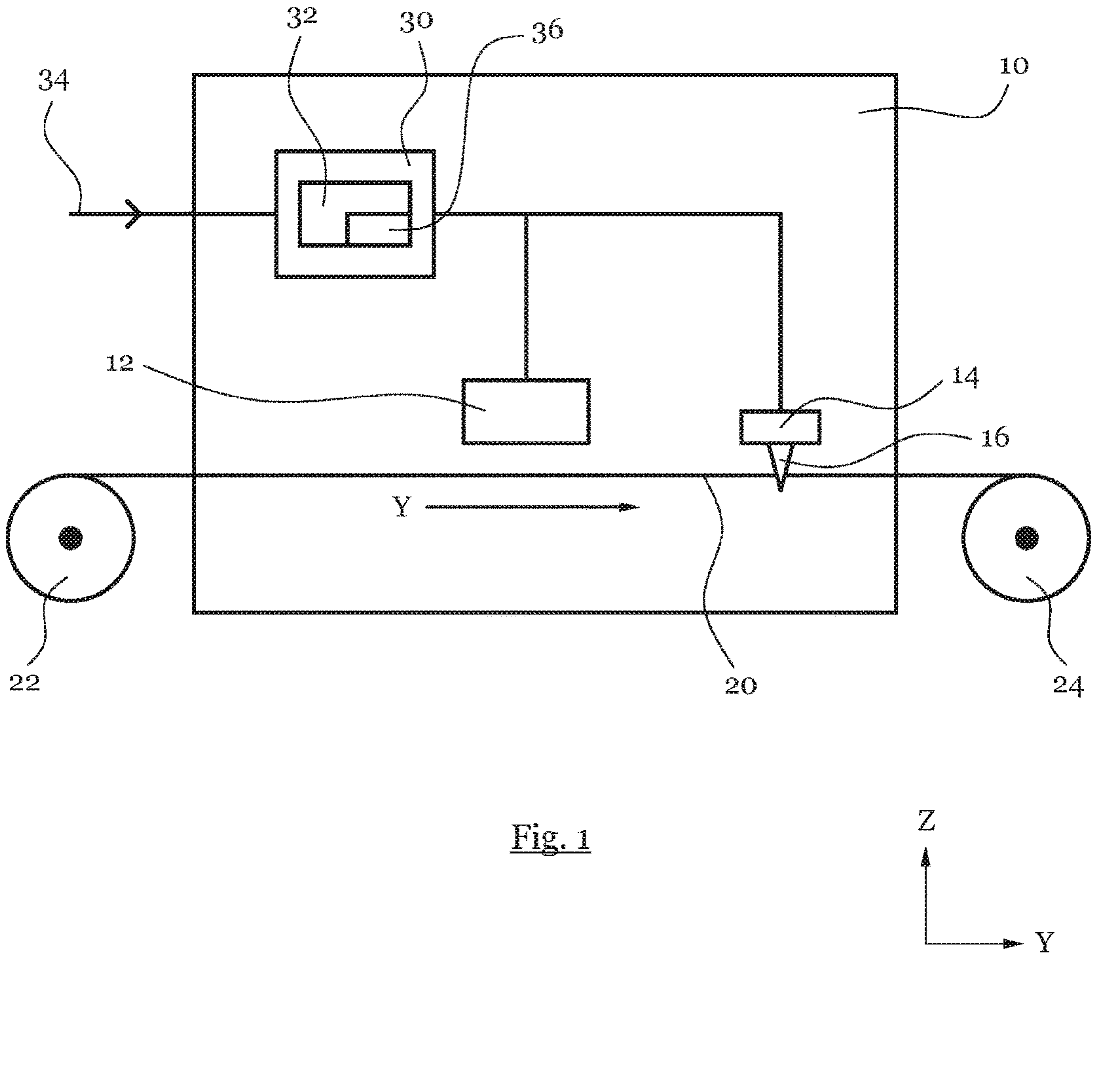
FIG. 1 shows a schematic diagram of a printer according to an example.

FIG. 1 shows an example of a printer 10 which may be a large format printer which prints on a continuous web of a print medium 20, such as a continuous web of paper, carton, textile or foil, for example. The print medium also may be provided as single sheets that are fed from an input tray or a drawer, or may be fed from a roll of paper, for example. The printer may be an inkjet printer or another type of printer, including a scanning printer or a printer having a page wide print bar.

In the example of FIG. 1, the printer 10 includes a printhead assembly 12 and a cutter assembly 14 which is located downstream of the printhead assembly 12, in a medium advance direction Y. The printhead assembly 12 may include a carriage to scan across the print medium 20 in a direction perpendicular to the medium advance direction Y. The scanning direction also is referred to as the X direction and, in FIG. 1, is perpendicular to the drawing plane. In the context of this application, a front view of the printer corresponds to a view in the X-Z plane, and a side view corresponds to a view in the Y-Z plane. A top view corresponds to a view in the X-Y plane.

The carriage may carry one or a number of printheads. The printhead or printheads may deposit a printing fluid on the print medium 20, when the print medium is transported through a print zone in the medium advance direction Y. For example, one replaceable ink jet printhead or four, MCYK, ink inkjet printheads may be provided in the carriage. A printing fluid may be dispensed from the printheads which may be any fluid that can be dispensed by an inkjet-type printer or other inkjet-type dispenser and may include inks, varnishes, and/or post or pre-treatment agents, for example.

In the example of FIG. 1, the print medium 20 may be transported from an input roll 22 to an output roll 24, passing the printhead assembly 12 and the cutter assembly 14. A print zone is located below the printed assembly 12 and may be defined as the entire area or part of the area which can be traversed by the carriage of the printed assembly 12. The print zone is an area through which a print medium is to be transported and where a print fluid is to be deposited on the print medium 20.

The cutter assembly 14 may include a cutting blade 16 which may be a knife like blade or a rotary cutting blade, for example. The cutter assembly 14 further may include carriage to scan across the print medium 20, parallel to the scanning direction X of the printhead carriage. The cutter assembly 14 further may be movable vertically, i.e. in the Z direction, to engage and disengage the cutting blade 16 with the print medium 20.

The printer further may include a controller 32 controlling the printhead assembly 12, the cutter assembly 14, and transport of the print medium 20 in the print medium advance direction Y. The controller 30 can be a microcontroller, ASIC, or other control device, including control devices operating based on software or firmware, including machine readable instructions, hardware, or a combination thereof. It can include an integrated memory 32 and/or communicate with an external memory via a communication interface 34. It also may comprise a user interface, such as a graphic user interface. The same controller or separate controllers may be provided for controlling carriage movement, printhead actuation, print medium advance and the cutter assembly, for example. Different parts of the controller may be located internally or externally to the printer 10, in a concentrated or distributed environment.

The memory 32 may store a computer program 36. The computer program 36 may include a code to instruct the controller 80 to control the printer 10, including the printhead assembly 12 and the cutter assembly 14, to perform a printing and cutting process, as illustrated further below.

In one example, the print medium 20 may be advanced through a print zone of the printer 20 below the printhead assembly 12 step by step, in image slice length increments, while printing an image slice per step; and the print medium 20 may be cut at an X cut line position, at the cutting blade 16, after a number of print medium advances. When cutting, the cutter assembly 14 and the printhead assembly 12 may operate in parallel to simultaneously cut the print medium in the X direction between two images and print an image slice of a downstream image to be printed. Cutting hence can be performed without interrupting the printing process and the cutting process can be synchronized with the printing process, as explained in further detail below. This allows increasing the printing throughput because the print medium can be cut between an upstream image and a downstream image while the downstream image is being printed.

The printing process for generating the downstream image is controlled in such a way that, when printing image slice by image slice, after N medium advances, with N being a natural number, a target X cut line position of the print medium is aligned to the cutting blade 16 at the actual X cut line position. To align the target X cut line position and the actual X cut line position, the slice length of one or some of the image slices may be adjusted. In the context of this disclosure, the target X cut line position refers to the position of the print medium where the print medium is to be cut, and the actual X cut line position refers to the actual position of the cutter assembly in the printer.

Figure 2:
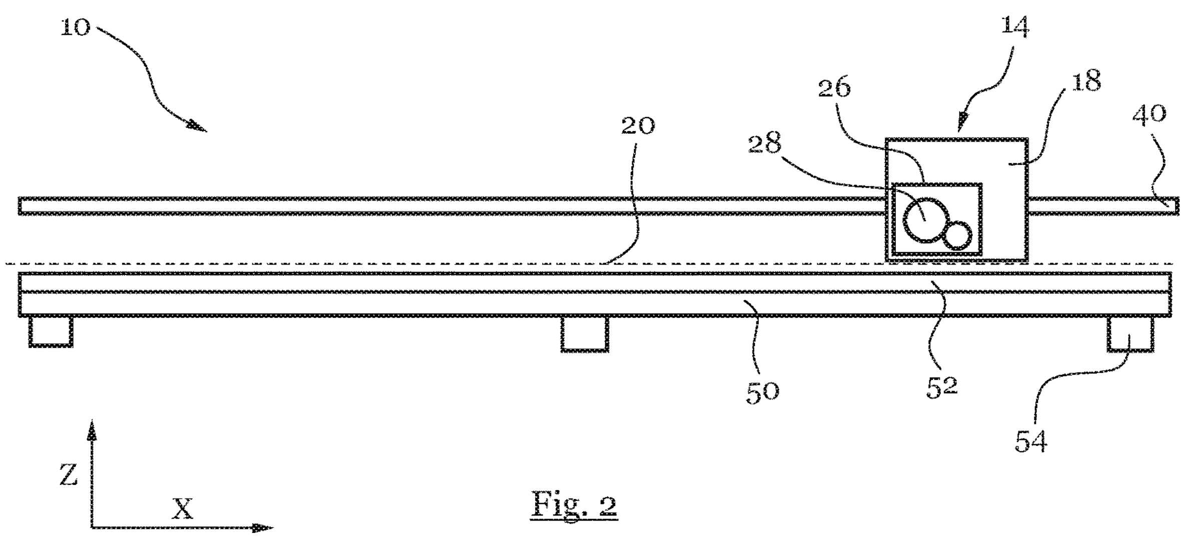
FIG. 2 shows a schematic front view of a cutter assembly in a printer according to an example.

FIG. 2 schematically shows a front view of a printer according to an example, including the cutter assembly 14 comprising a cutter carriage 18 which carries a cutter module 26. In this example, the cutter module 26 includes a rotary cutting blade 28. The cutter module 26 can be designed to be lowered and raised and to engage and disengage the rotary cutting blade 28 with the print medium 20. The cutter carriage 18 is movable in the scanning direction X along a shaft 40. The printhead assembly, including the printhead carriage, may be located behind the cutter assembly 14 and is not visible in FIG. 2. Below the cutter assembly 14, the print medium is schematically shown at 20. The print medium is transported below the cutter assembly 14 in the medium advance direction Y which, in FIG. 2, is perpendicular to the drawing plane.

In the example of FIG. 2, the rotary cutting blade 28 interacts with an opposite linear cutting blade 52 which may be attached to a support 50 which may be raised and lowered via actuators 54 to engage and disengage the rotary cutting bay 28 and the opposite linear cutting blade 52 to cut the print medium therebetween.

Figure 3:
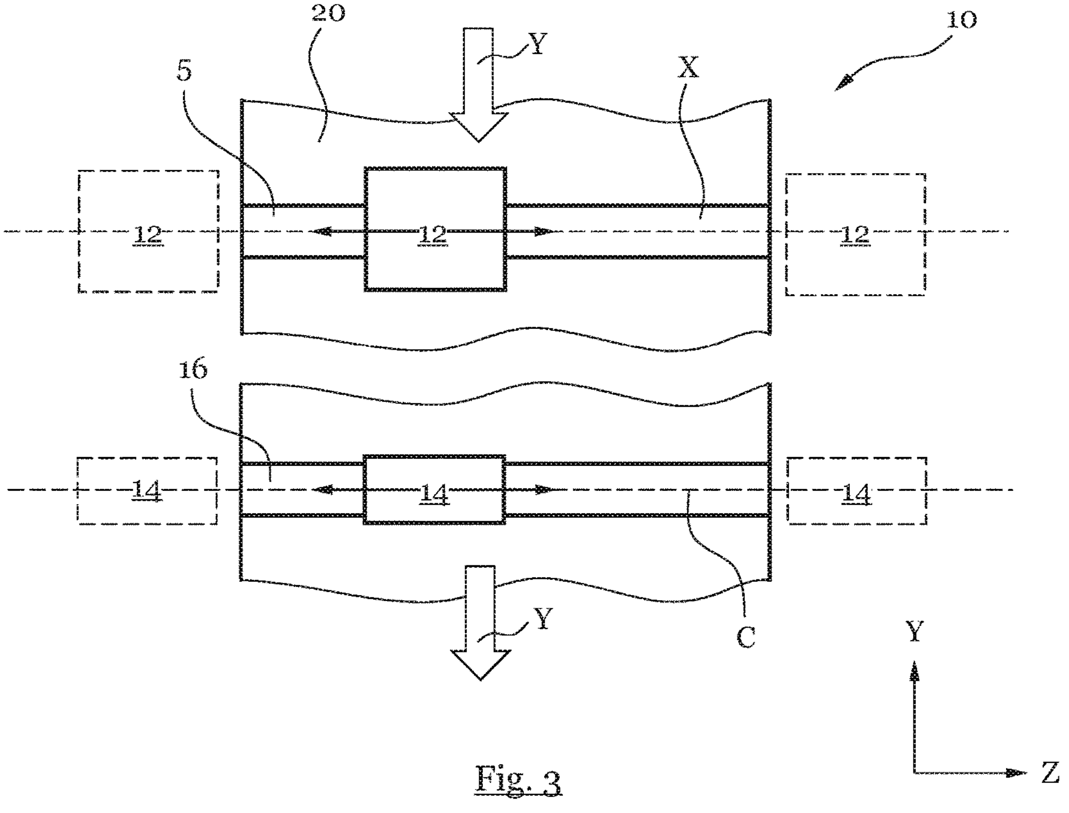
FIG. 3 a schematic top view of a printer according to an example.

FIG. 3 shows a schematic top view of a printer 10, including print medium 20 which advances below the printhead assembly 12 in the medium advance direction Y. The printhead assembly 12 comprises a carriage to scan over the print medium 20 in opposite scanning directions X perpendicular to the print medium advance direction Y and parallel to the a cutting direction C. The printhead assembly 12 scans across the print zone, printing a swath S on the print medium 20 after each medium advance movement.

In an alternative configuration, not shown in the drawings, the printer includes a page wide print bar which extends across the width of the print medium 20, perpendicular to the medium advance direction Y. Also in this case, the print bar can print swathes on the print medium 20 after each medium advance movement. The cutter assembly 14 is carried by an associated cutter carriage and scans and cuts along a cut line C, downstream of the print zone.

The controller 30 instructs the printhead assembly 12 to print respective image slices between two medium advance movements for printing on subsequent portions of the print medium 20, instructs the cutter assembly 14 to cut between two defined medium advance movements, for separating a printed image from the print medium during the scanning action and without interrupting the print process of the print medium 20 currently undergoing printing. Examples of a printing and cutting process are illustrated in further detail with reference to FIG. 4 to 9 and FIGS. 10 to 12. The printer may perform any of the printing and cutting processes described herein.

Figure 4:
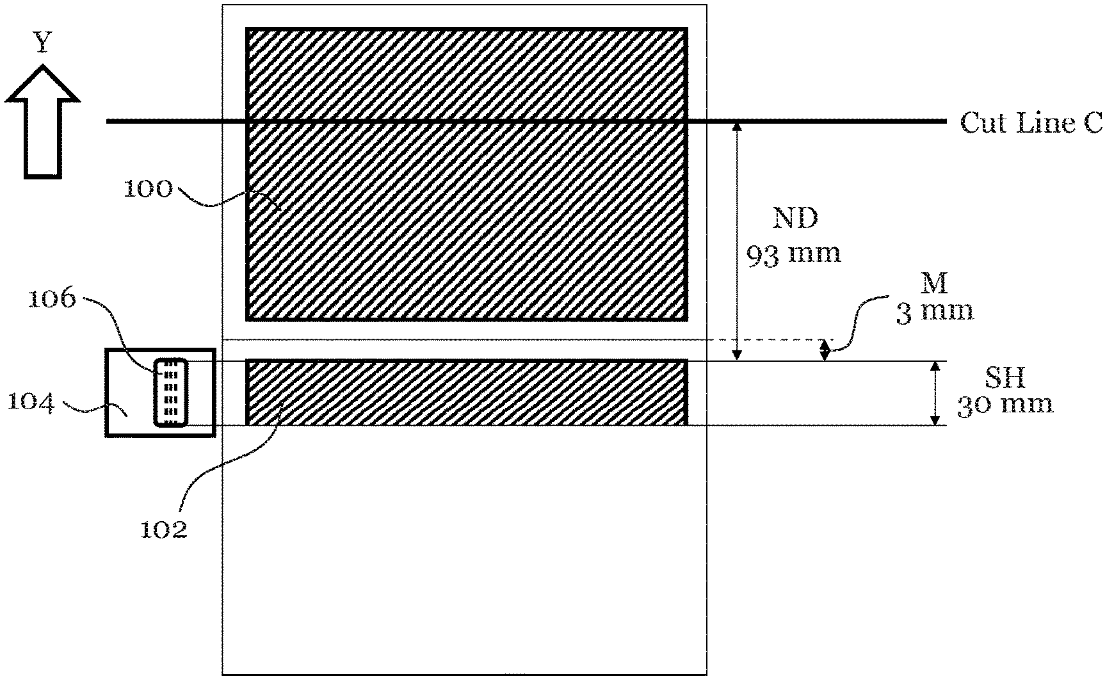
FIG. 4 shows a schematic diagram illustrating a process according to an example.
Figure 5:
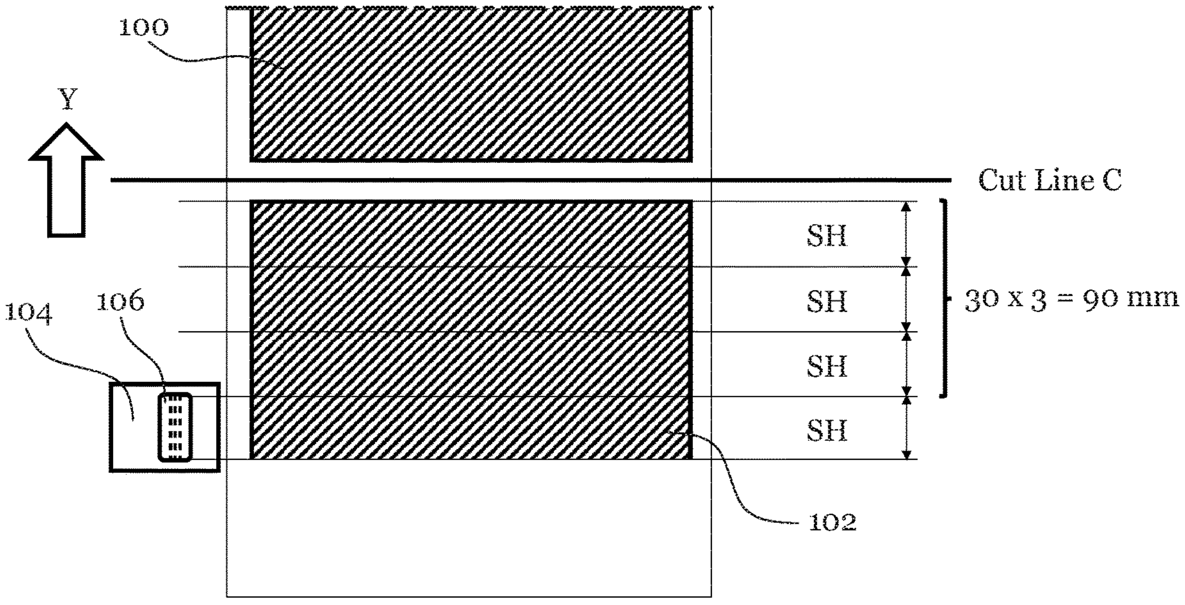
FIG. 5 shows a schematic diagram illustrating a process according to an example.

FIGS. 4 and 5 illustrate an ideal case with a zero offset. This example is illustrated with reference to FIG. 10. A first upstream image 100 and a second downstream image 102 are printed by a printhead 104 having a nozzle array 106. The nozzle array 106 defines the maximum swath height SH which, in this example, is 30 mm, without any limitation thereto. The maximum swath height SH may correspond to an image slice length for printing an images slice, between two medium advances in the medium advance direction Y. Each medium advance may correspond to an image slice length or swath height SH.

If printing is performed in an overlapping mode, such that one printed swath overlaps with the subsequent printed swath, an image slice length and corresponding medium advance may be smaller than the swath height. For ease of illustration, the following disclosure refers to a scenario where swath height SH, medium advance steps and image slice length are the same or approximately the same but the same principle as disclosed herein, mutatis mutandis, also can be applied to an overlapping print mode in which swath height, image slice length and medium advance steps are different from each other, taking into account a swath overlap.

A nominal distance ND between the printhead 104 and an X cut line position C where the cutting device is located in the printer can be a value specified by a printer manufacturer and may be stored in memory. The method obtains the nominal distance ND at block 110 in FIG. 10. The nominal distance may be defined as the distance between a leading edge of the printhead 104 or any reference point of the printhead 104, such as a leading nozzle row in the medium advance direction Y, and the actual X cut line position C in the printer. In this example, the nominal distance ND is specified as 93 mm, without any limitation thereto. In the present example of the ideal case shown in FIGS. 4 and 5, it is assumed that the printhead 104 and the X cut line position C are where they are expected to be so that there is no calibration offset or, in other words, the calibration offset is zero.

The nominal distance ND may or may not be the distance across which the downstream printed image 102 is to move to align the target X cut line position with the actual X cut line position C. For example, an image margin may be defined by a print job, instructing the cutter assembly to generate a cut line at a defined distance to the leading edge of the image. In this example of the ideal case shown in FIGS. 4 and 5, the image margin M is specified as 3 mm, without any limitation thereto.

The method further obtains a predetermined slice length corresponding to a first medium advance step as determined by a print mode, for example; see block 112. The predetermined slice length may be a nominal slice length as determined by the print mode. The information obtained may be information stored in memory, internally or externally to the printer and provided to the controller directly or through a suitable interface and, at least in part, also may be information provided by a user, through sensors, such as position sensors, or otherwise input to the controller.

In general, the method determines and adjusts image slice lengths of the downstream image 102, at 114, in such a way that the leading edge of the downstream image 102 plus the margin M, i.e. the target X cut line position, arrives at the actual X cut line position C after a defined number of medium advances, such as N medium advances. The adjusted slice lengths of the image to be printed may be determined as a function of the nominal distance and an offset. In this example of the ideal case shown in FIGS. 4 and 5, the slice length may be determined based on the nominal distance ND, e.g. 93 mm, and the margin M, e.g. 3 mm, as an offset. In this example, the target X cut line position arrives at the actual X cut line position C results after 3 medium advances of equal length which can be calculated as: ND−M=93 mm−3 mm=90 mm=3×30 mm=3×SH.

Accordingly, at 116, a leading edge of a to be printed image is aligned with the nozzle array 106 of the print head 104 and the first image slice is printed as shown in FIG. 4. After printing the first image slice of SH=30 mm, the print medium 20 is advanced N−1 times, i.e. two times in this example, at 118, by the swath height SH=30 mm and, after each medium advance, a further image slice is printed, 120.

After N−1 medium advances, the print medium is advance a further time by the swath height, to arrive at an Nth medium advance, with N=3 in this example, at 122. Then the target X cut line position of the print is aligned to the actual X cut line position C and a further image slice is printed while, at the same time, cutting the print medium at the X cut line position, at 124, as shown in FIG. 5. In this ideal example, all image slices may have the same slice length with an adjustment of zero.

Accordingly, when the print medium is advanced through the print zone below the printhead 104 of the printer, slice by slice, in slice length increments, an image slice is printed between each medium advance. After N medium advances, with N being a natural number and N=3 in this example, the target X cut line position of the print medium is aligned to the X cut line position C and the print medium is cut at the X cut line position C while, at the same time, printing the next (in this example, the fourth) image slice, at 124.

FIG. 4 illustrates the method at a stage when printing the first image slice and FIG. 5 illustrates the method at a stage when printing the Nth image slice and simultaneously cutting the print medium at the target X cut line position.

In many instances, a real world scenario deviates from this ideal case. A number of causes for such deviation may occur individually or in any combination thereof. For example, the printhead may be offset from its nominal position by a printhead calibration error. In another example, the cutting device and hence the X cut line position may be offset from its normal position by a cutting device calibration error. Further, the margin M may not be such that an integer number of equal length medium advances will align the target X cut line position of the print medium with the actual X cut line position of the cutting device. Another deviation may be caused by a given print mode which selects a leading nozzle row of the nozzle array 106 for printing the first swath which is offset from the most downstream nozzle row; that is, according to a given print mode, a first swath is to be printed by an upstream portion of the nozzle array 106, instead of the entire nozzle array. These and other deviations, either individually or any combination thereof, may be taken into account by adjusting a slice length of an image to be printed as a function of the nominal distance and an offset. The print medium then is advanced according to the adjusted slice length.

The adjustment may be made relative to a nominal slice length as determined by the print mode. The slice length e.g. may be reduced relative to the nominal slice length to reduce the length of a predetermined image slice. Under some circumstances, the adjustment also could increase the length of a predetermined image slice. In one example, the image slice to be adjusted is a first image slice, a second image slice or an Nth image slice of the downstream image to be printed and wherein the length of other image slices corresponds to the nominal slice length.

Figure 6:
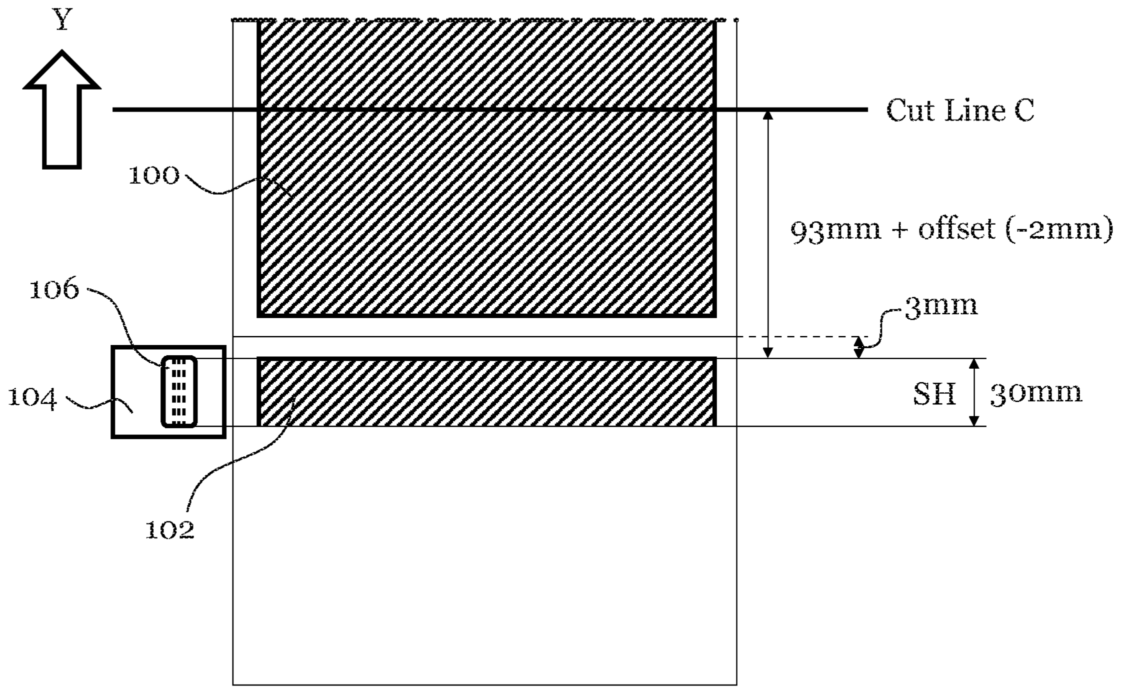
FIG. 6 shows a schematic diagram illustrating a process according to an example.

FIG. 6 shows a scenario which is similar to the example of FIGS. 4 and 5 in that a first upstream image wo and a second downstream image 102 are printed by a printhead 104 having a nozzle array 106. The nozzle array 162 defines a maximum swath height SH which, in this example, is 30 mm, without any limitation thereto. Unless described otherwise, reference is made to the description of the ideal case shown in FIGS. 4 and 5.

The example of FIG. 6 to 9 is illustrated with reference to FIG. 11. Also in the example of FIG. 6 to 9, the method obtains a nominal distance ND between the printhead 104 and an X cut line position C where the cutting device is located in the printer, at 210 in FIG. 11. The nominal distance may be a value as specified by a printer manufacturer. Also in this example, the nominal distance ND is specified as 93 mm, without any limitation thereto.

In the example of FIG. 6 to 9, it is assumed that the printhead 104 and the cut line position C have an actual distance which deviates from the nominal distance ND by a calibration offset, e.g. offset of −2 mm, without limitation thereto. The calibration offset may be due to tolerances in the manufacture and assembly of the print head or the cutting device or both, for example. Accordingly, the actual distance between the nozzle array 106 and the X cut line position C is 93 mm−2 mm=91 mm, in this example.

Additionally, an image margin may be defined by the print job, instructing the cutter assembly to generate a cut line at a defined distance to the leading edge of the downstream image. Also in this example, the margin M is specified as 3 mm, without any limitation thereto.

There may be further variations creating or contributing to an offset, such as a different image margin and/or a print mode which does not start printing with the most downstream nozzle row of the nozzle array 106.

Figure 11:
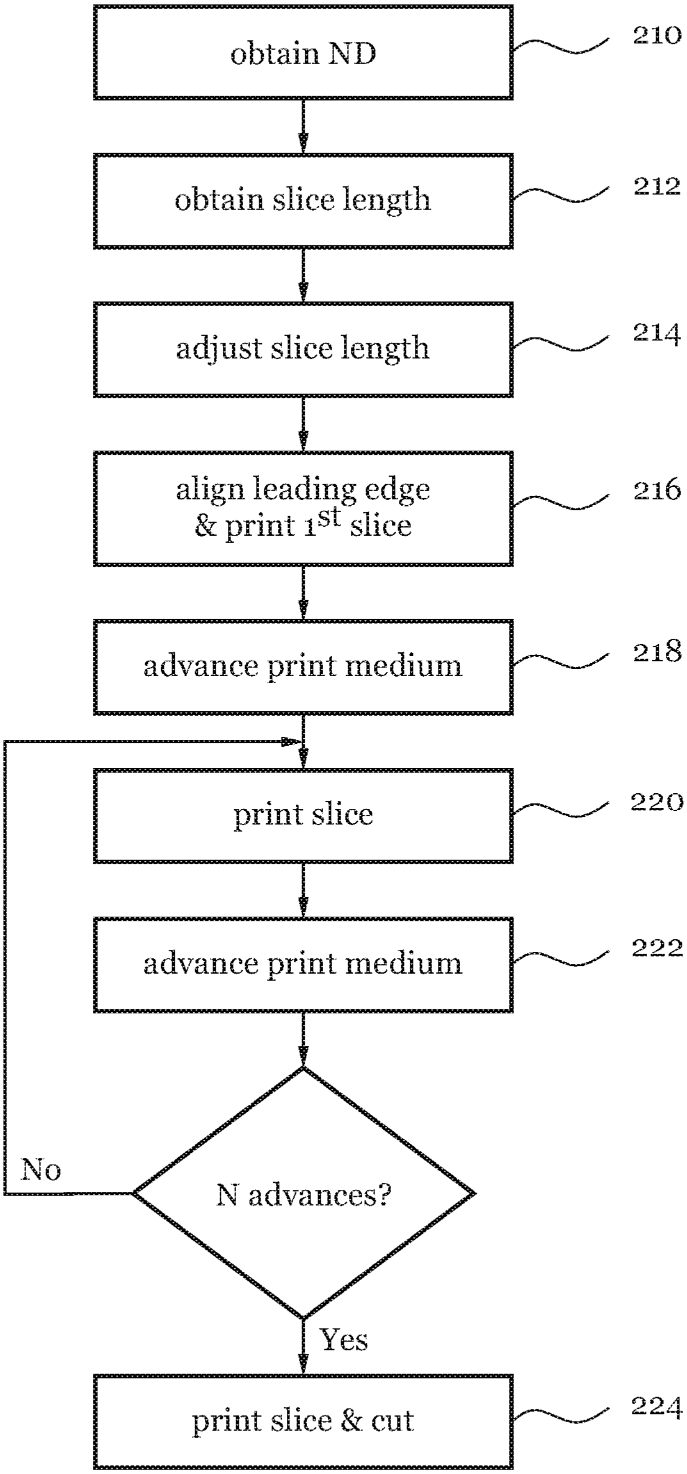
FIG. 11 shows a flowchart of a method according to a further example.

A first image slice length, also referred to as predetermined slice length, as defined by a print mode is obtained at 212 in FIG. 11. The predetermined slice length may correspond to the swath height SH or portion thereof. In the following description, it is assumed that the predetermined slice length corresponds to a nominal slice length which is equal to the maximum swath height, without limitation thereto. The same principles, mutatis mutandis, can be applied to another scenario where a print provides for the predetermined slice length does not correspond to the maximum swath height SH.

Figure 7:
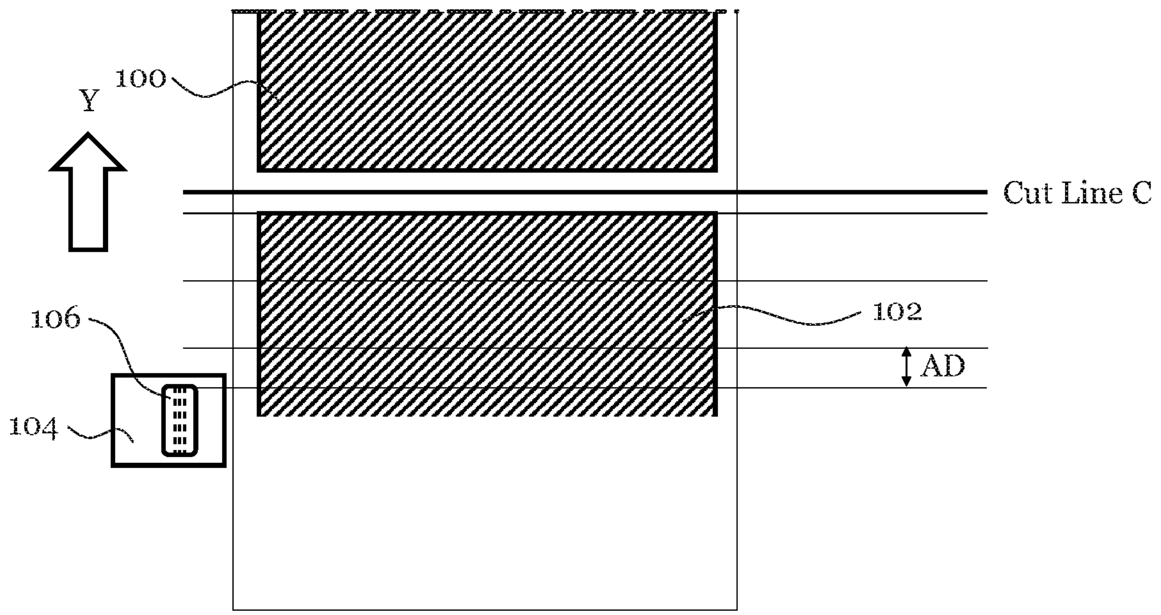
FIG. 7 shows a schematic diagram illustrating a process according to an example.

If, in the example of FIG. 6, the method would proceed by advancing the print medium in steps corresponding to predetermined slice lengths, e.g. corresponding to a nominal swath height SH, e.g. in steps of 30 mm in this example, the target cut line position of the print medium would not arrive at the X cut line position C after an integer number of medium advances but an additional step which is a fraction of a nominal swath height would have to be inserted to align the target cut line position of the print medium with the X cut line position C. An example of this additional step AD is shown in FIG. 7. The print medium then would make an extra halt to position the target cut line of the print medium at the X cut line position C, as shown in FIG. 7. Accordingly, under these circumstances, the printer would print an Nth image slice, and advance the print medium by a fraction of the nominal swath height, cut the print medium, and then advance the print medium by the remaining fraction of the swath height to position the print medium for printing the next image slice. Accordingly, there would be an extra stop for cutting.

Instead of proceeding as shown in FIG. 7, the method adjusts an image slice lengths of a predetermined image slice of a downstream image 102, at 214, in such a way that the leading edge of the image 102 plus the margin M arrives at the X cut line position C after a defined number of medium advances. The adjusted slice length of the image to be printed may be determined as a function of the nominal distance and the offset. In this example, the slice length may be determined based on the nominal distance ND, e.g. 93 mm, the margin M, e.g. 3 mm and the calibration offset of −2 mm.

The predetermined image slice may be adjusted in such a way that an integer number of medium advances, corresponding to an image slices of the nominal swath height or to the predetermined slice length determined by the print mode, plus one medium advance corresponding to the adjusted image slice length will align the target cut line with the X cut line position C. With reference to the example shown in FIG. 8, the adjusted image slice length can be calculated based on: ND−M−offset−x SH=93 mm−3 mm−2 mm−x SH=88 mm−x 30 mm=88 mm−2×30 mm=28 mm, with x being an integer number and in this example x=2.

x may be the number of medium advances corresponding to the predetermined slice length which the downstream printed image could advance without the target cut line moving beyond the X cut line position C. Accordingly, the print medium may be advance x times the nominal slice length and once the adjusted slice length so that a total of N medium advances aligns the target X cut line position with the actual X cut line position C, with $N=_3$ in this example.

Figure 8:
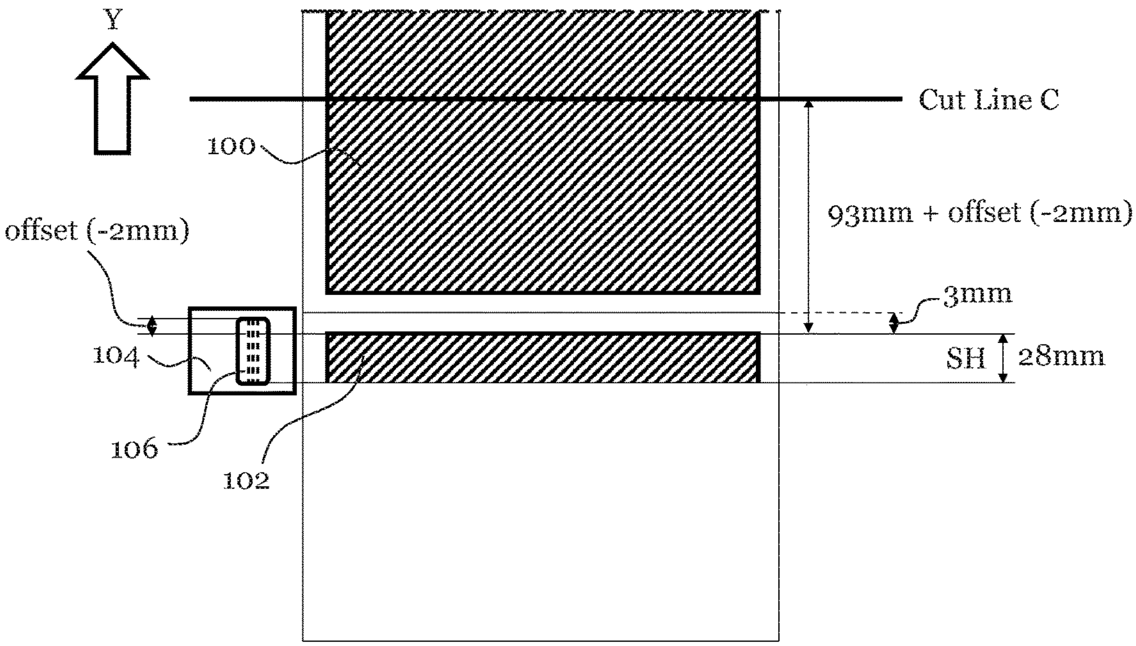
FIG. 8 shows a schematic diagram illustrating a process according to an example.

In the example of FIG. 8, the length of the first image slice is adjusted by reducing the length of the nominal swath height by 2 mm. However, it is also possible to adjust the length of another one of the image slices, such as the second slice, an Nth image slice or an image slice between the first and the Nth one. Accordingly, in this example, a leading edge of an image to be printed is aligned with a leading nozzle row for printing the first image slice having the adjusted image slice length and the first image slice is printed, at 216. After printing the first image slice of reduced length, the print medium 20 is advanced once by a medium advance distance corresponding to the adjusted image slice length, at 218. Then the next image slice is printed, at 220. The print medium is advanced again by the nominal swath height SH, at 222.

Figure 9:
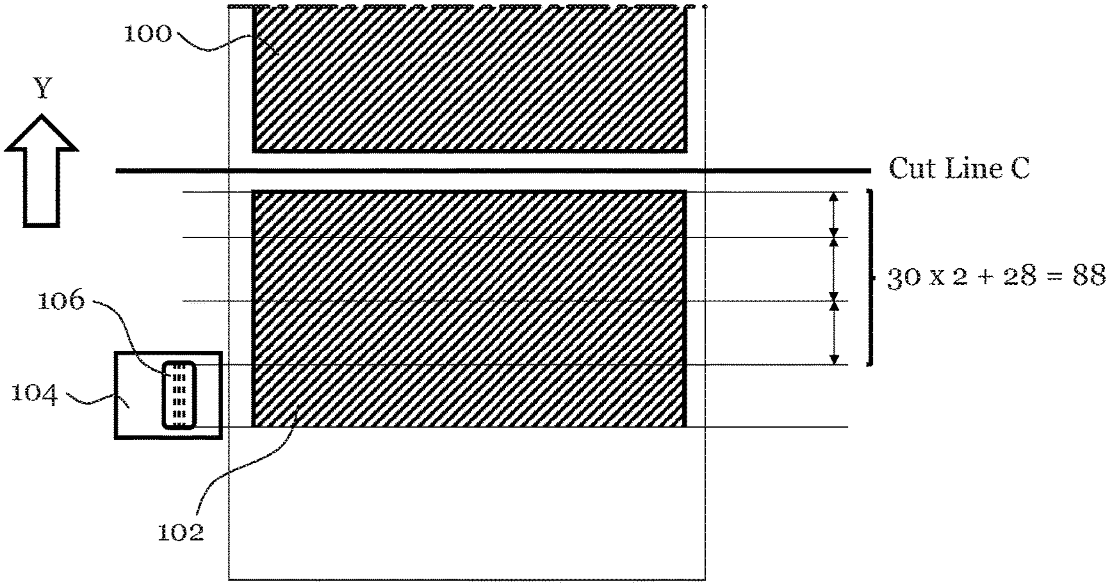
FIG. 9 shows a schematic diagram illustrating a process according to an example.
Figure 10:
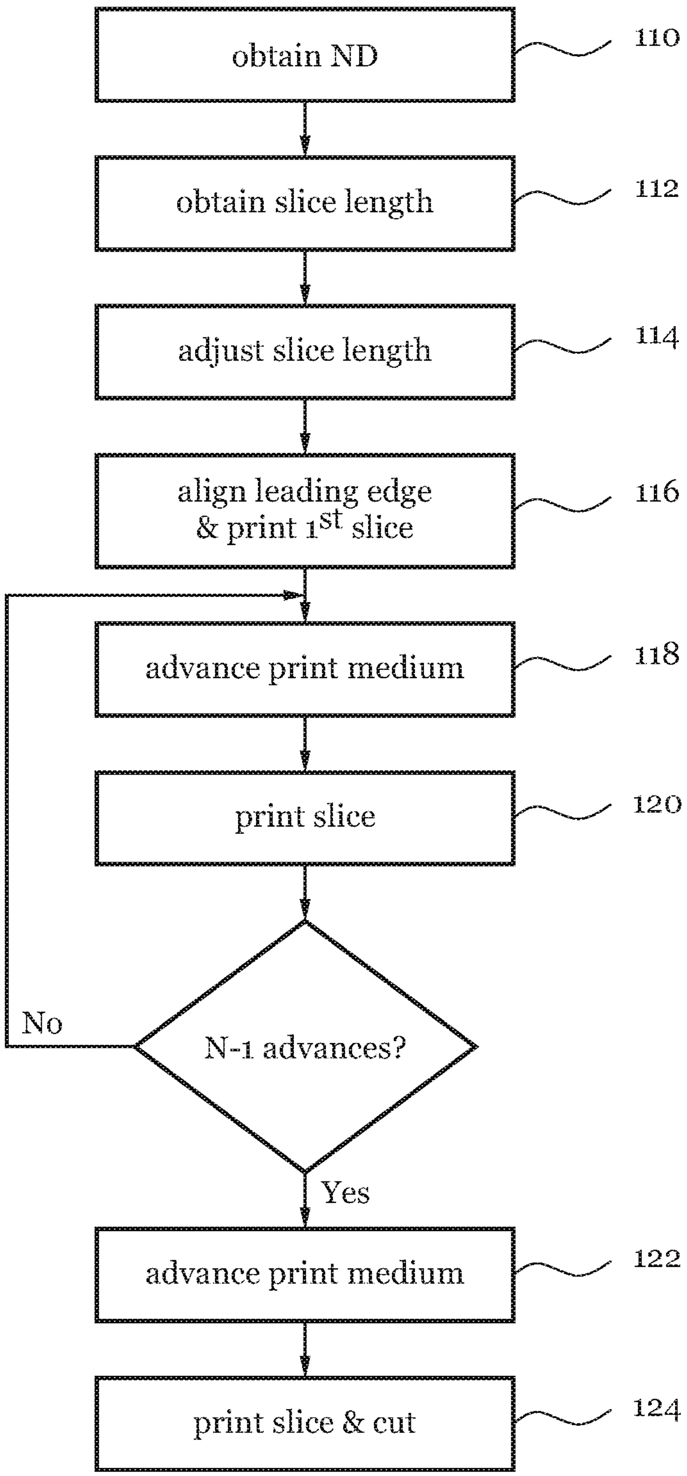
FIG. 10 shows a flowchart of a method according to an example.

It is determined whether the print medium has been advanced by a predetermined number of steps, such as N=3 in this example. If no, printing at 220 and advancing at 222 is repeated. After N medium advances, it is recognized that the target X cut line position of the print medium is aligned to the X cut line position C, as shown in FIG. 9. After the Nth medium advance, an image slice is printed and the print medium is cut simultaneously, at 224. In this example, the length of the first image slice is reduced and all subsequent image slices may have a same slice length corresponding to the nominal swath height or the predetermined slice length determined by the print mode.

FIG. 6 illustrates the method at a stage when printing the first image slice without adjustment, and FIG. 7 illustrates the method at a stage at which, after printing the Nth image slice, the print medium is advanced by a fraction of a swath height to position the print medium for cutting. FIG. 8 illustrates the method at a stage when printing the first image slice with adjusted slice length, and FIG. 9 illustrates the method stage at which, after printing the Nth image slice, the target X cut line of the print medium is aligned with the actual X cut line position C so that a subsequent image slice can be printed simultaneously with cutting the print medium.

As explained above, in addition to a calibration error of the cutting assembly or the printhead assembly, there may be further causes which introduce an offset to the nominal distance ND. For example, the margin M may not be such that integer number of equal length medium advances will align the target X cut line position of the print medium with the actual X cut line position of the cutting device. Another deviation may be caused by a given print mode which selects a leading nozzle row of the nozzle array 106 for printing the first swath which is offset from the most downstream nozzle row; that is, according to a given print mode, a first swath is to be printed by an upstream portion of the nozzle array 106, instead of the entire nozzle array. These and other deviations, either individually or any combination thereof, may be taken into account by adjusting a slice length of an image to be printed as a function of the nominal distance and an offset. The print medium then is advanced according to the adjusted slice length.

Figure 12:
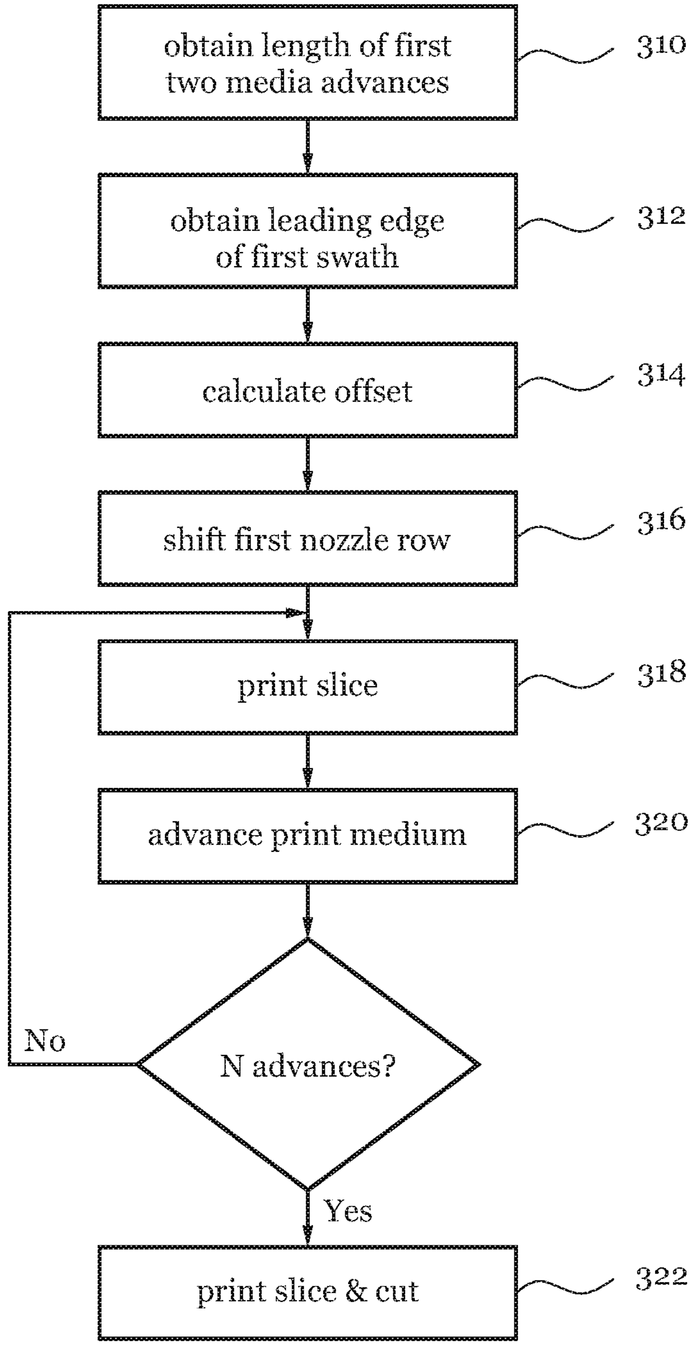
FIG. 12 shows a flowchart of a method according to another example.

A further example of adjusting the length of an image slice is explained with reference to FIG. 12. The method proceeds based on a given print mode which determines the length of medium advances which may be the same or different for each individual advance. In one example, a defined length of the first two medium advances, as determined by the print mode, is obtained, at 310. In one example, the first swath height and the associated medium advance may be less than a nominal swath height because the print mode uses a reduced swath height for the first swath and the second swath height and the associated medium advance may correspond to the nominal swath height.

Further, the position of the leading edge of the first swath relative to the nozzle array 106 is obtained and, more specifically, the position of the most downstream row of nozzles to be used for printing the first swath as defined by the print mode, at 312. This is done because some print modes do not use the entire nozzle array for printing a first swath but may use an upstream portion, middle portion or downstream portion of the nozzle array.

The method proceeds with calculating an offset based on a defined margin, the position of the cutter assembly relative to the printhead, including any calibration error if there is one, the position of the most downstream nozzle row used for printing the first swath previously obtained and the length of the first two medium advances as previously obtained, at 314. If, based on the margin and the calibration error, for example, an offset to be applied to the first image slice is determined, the method proceeds with shifting the first nozzle row that will print the leading edge of the first image slice in a first pass of the print out to adjust the first slice length, similar to what is shown in FIG. 8, at 316.

Accordingly, the first image slice actually printed will include a fraction of the first image slice as originally determined by the print mode. Accordingly, in the first and subsequent passes of printing image slices, the image will be shifted by the same offset, propagating the offset through the subsequent image slices down to the last one. That is, the size of a first image slice to be printed is recalculated to allow the first size of the image to be reduced in length and the length of the further slices to remain as determined by the print mode. This implies that the image content slicing will be shifted throughout the image with those pixels not depicted in the first slice shifted to the second slice and so forth. This will be propagated until the end of the image. If a masking scheme is applied to the nozzle array, the mask as such may remain unchanged but the respective nozzle rows used for printing each slice may be shifted.

It even may happen that the slice length of the first image slice is adjusted to zero and the length of the second image slice is adjusted so that a sum of the adjusted second slice length plus an integer multiple of the nominal slice length corresponds to the distance between the leading edge of an image to be printed and the X cut line position.

Accordingly the method proceeds with printing subsequent image slices, 318, and advancing the print medium accordingly, at 320, as determined for the first and subsequent passes of printing image slices. The length of print medium advance corresponds to the length of the image slice just printed. For example, the first image slice and the first print medium advance may have an adjusted length and the second and further image slices and print medium advances may have a nominal length. After the print medium has been advanced N times, the system will know that the target X cutline position is aligned to the actual X cutline position C and will proceed with simultaneous the printing the next image slice and cutting the print medium, at 322.

In the examples, after an Nth medium advance, the next image slice can be printed simultaneously with cutting the print medium, at 322, so that no extra stop will be made for cutting the print medium. Instead of adjusting the length of the first image slice is also is possible to adjust the length of an image slice further upstream up to the Nth image slice. The described method provides a flexible strategy to parallelize printing movement and cut operations whenever variable printing parameters change. For different print modes and different user selections, e.g. with regard to image margins, image slicing can be adapted. A user can freely select and change image margins, even between subsequent printed images and beyond a selection offered by a printer. Additionally, different hardware tolerances of the printer, including the printhead assembly and the cutting assembly, can be compensated. Printing throughput can be enhanced.

The invention claimed is:

1. A method, including:

obtaining a nominal distance between a printhead and an actual X cut line position of a cutting blade in a printer, wherein the actual X cut line position is along a cutting direction perpendicular to a medium advance direction;

obtaining a predetermined slice length of an image to be printed, wherein the predetermined slice length has a width along the medium advance direction;

determining an adjusted slice length as a function of the nominal distance and an offset such that the actual X cut line is aligned with a target X cut line position of a print medium after a number N of print medium advances defining a first image;

advancing a print medium through a print zone of the printer in accordance with the predetermined slice length or the adjusted slice length, and printing an image slice after a print medium advance;

repeating the advancing and printing the number N of times of the first image; and after the Nth print medium advance defining the first image, simultaneously printing an image slice of a subsequent downstream image and cutting the print medium at the X cut line position between the first image and the subsequent downstream image.

2. The method of claim 1 wherein the predetermined slice length is a nominal slice length and the adjusted slice length is smaller than the nominal slice length.

3. The method of claim 2, wherein a first image slice, second image slice or Nth image slice has the adjusted slice length and a first print medium advance, second print medium advance or Nth print medium advance corresponds to the adjusted slice length.

4. The method of claim 3 wherein at least one other image slice of the N number of image slices has the nominal slice length and at least one other print medium advance corresponds to the nominal slice length.

5. The method of claim 2 wherein the offset is determined taking into account at least one of: the position of a leading edge of an image to be printed relative to a defined nozzle row of the printhead, an actual distance between a printhead and the cut line, a calibration offset of the printhead, a calibration offset of the X cut line position, and an image margin.

6. The method of claim 2, the method further comprising:

obtaining a leading nozzle row of the nozzle array for printing the first image slice as defined by the print mode;

for the first image slice to be printed, shifting the leading nozzle row to be used for printing to adjust the slice length as a function of the offset; and for subsequent image slices to be printed, shift the image to be printed across the nozzle rows of the nozzle array accordingly.

7. The method of claim 6 wherein the slice length of the first image slice is adjusted so that a sum of the adjusted slice length plus an integer multiple of the predetermined slice length corresponds to the distance between the leading edge of an image to be printed and the X cut line position.

8. The method of claim 6 wherein the slice length of the first image slice is adjusted to zero and the length of the second image slice is adjusted so that a sum of the adjusted second slice length plus an integer multiple of the nominal slice length corresponds to the distance between the leading edge of an image to be printed and the X cut line position.

9. The method of claim 2, the method further comprising:

obtaining a defined length of medium advance, as determined by a print mode, and a position of a leading edge of a first swath relative to a nozzle array used for printing the first image slice, wherein the length of the first image slice to be printed is reduced by shifting the leading edge of the first swath to an adjusted leading edge taking into account the offset to adjust the slice length of the first image slice.

10. The method of claim 9 wherein part of image content is shifted from the first image slice to the second image slice with those pixels not depicted in the first image slice shifted to the second image slice.

11. The method of claim 10 wherein shifting of part of image content is propagated through subsequent image slices until the end of the image.

12. The method of claim 1 wherein the distance between a leading edge of an image to be printed and an X cut line position is determined as a sum of a nominal distance between a reference line of the printhead and an X cut line position in a printer;

an offset between the reference line of the printhead and a leading nozzle row of a nozzle array of a printhead for printing a first image slice;

a calibration offset of the printer; and an image margin.

13. The method of claim 12 wherein the leading row is determined by a masking scheme for printing a first image slice.

* * * * *